United States Patent

Reaves

[15] 3,688,645
[45] Sept. 5, 1972

[54] VANE-TYPE ACTUATOR
[72] Inventor: Henry V. Reaves, Houston, Tex.
[73] Assignee: Matryx Corporation,
[22] Filed: June 29, 1970
[21] Appl. No.: 50,623

[52] U.S. Cl..................................92/125, 251/59
[51] Int. Cl..........................F01c 9/00, F16k 31/143
[58] Field of Search.........................251/59; 92/125

[56] References Cited

UNITED STATES PATENTS

| | | | |
|---|---|---|---|
| 3,428,085 | 2/1969 | Haberstump | 92/125 X |
| 3,554,096 | 1/1971 | Dejager | 92/125 |
| 2,736,516 | 2/1956 | Wolf | 92/125 X |
| 3,289,549 | 12/1966 | Purcell | 92/125 X |
| 3,277,796 | 10/1966 | Wessell et al. | 92/125 |
| 2,313,177 | 3/1943 | Sprague | 251/59 |

FOREIGN PATENTS OR APPLICATIONS 623,229 | 1949 | Great Britain..............92/125

Primary Examiner—Arnold Rosenthal
Attorney—J. Warren Kinney

[57] ABSTRACT

Valve control apparatus including a housing having a shaft member rotatably mounted therein. One end of the shaft member is connected to a valve stem of a valve to be controlled. The shaft member has a radially projecting vane fixed thereto which is rotatable through a predetermined arc within the housing. A unitary seal is provided to encircle the shaft member above and below the vane and to surround the periphery of the vane. A groove is formed in the periphery of the vane to support the seal. Fluid is selectively introduced into the housing to rotate the vane and shaft member in a desired direction. The unitary seal provides a continuous sealing surface which prevents fluid leakage from one side of the vane to the other and prevents fluid leakage from the inside to the outside of the housing along the shaft member.

1 Claim, 5 Drawing Figures

PATENTED SEP 5 1972

Henry V. Reaves
INVENTOR

BY
Arnold, White & Durkee
ATTORNEYS

Henry V. Reaves
INVENTOR

BY
Arnold, White & Durkee
ATTORNEYS

VANE-TYPE ACTUATOR

This invention relates to valve control apparatus, and particularly to valve control apparatus having a vane member mounted for rotary movement and operated by fluid pressure.

BACKGROUND OF THE INVENTION

Heretofore, valve control apparatus have been provided which upon actuation rotate the stem of a valve to open and close the valve as desired. Some of these devices typically have been actuated by hydraulic cylinders and utilize some mechanism, such as a scotch yoke, to convert linear motion into rotary motion for controlling the valve. An example of such a device is shown in U.S. Pat. No. 3,104,592. Another example is shown in applicant's copending application Ser. No. 38,971 entitled "Valve Control Apparatus", filed May 20, 1970. These device are somewhat complex in design and generally have several moving parts which are subject to wear. Other devices utilize a rotary vane actuated hydraulically or pneumatically to control rotation of the valve.

SUMMARY OF THE INVENTION

The subject invention includes a rotatable shaft having a radially projecting vane with a relatively large flat surface area connected thereto. One end of the shaft is connected to a valve stem. The vane portion of the shaft member is rotatable in a housing. A unitary seal provides a continuous seal along the periphery of the vane and around the upper and lower periphery of the shaft. The seal is supported in a groove formed in the vane and typically is molded in one piece and has a circular cross section. Pressure connections are formed at suitable locations in the housing to admit pressurized fluid, either air or liquid, into the housing to rotate the vane from one position to another. The subject apparatus has many advantages among which include there is only one moving part. Additionally, the seal arrangement is very effective and provides for efficient operation of the device. The seal is supported against lateral movement with respect to the vane and thus is able to withstand the stresses caused by rotation of the vane. The apparatus is very smooth in operation and the only part that can wear is the seal which is easily replaceable. Hence, the device has an exceptionally long life and requires little maintenance. Additionally, the design of the subject valve control apparatus is extremely compact and is particularly suitable for applications in places where space is at a premium.

Other advantages of the present invention will be apparent from the following detailed description when considered in conjunction with the following detailed drawings.

DESCRIPTION OF THE INVENTION

Figure 1:
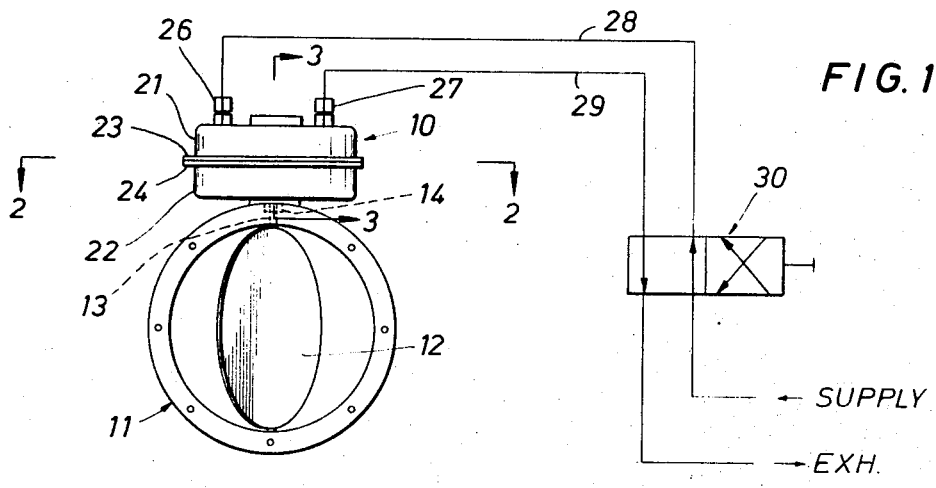
FIG. 1 is a front elevational view illustrating the valve control apparatus as connected to the valve, and schematically showing the fluid system for operating the valve control apparatus.

Referring to FIG. 1, there is shown valve control apparatus generally designated as 10, mounted on top of a butterfly valve generally designated as 11. The valve 11 is typically connected in a pipeline and has a vane 12 which is rotatably mounted on a shaft 13 connected to a valve stem 14.

The upper end of the valve stem 14 typically has a square head (not shown) which mates with a socket type connection 35 formed in the lower end of a shaft member 17 of the valve control apparatus 10. Other suitable connecting facilities, such as a keyed connection, may be utilized to connect the valve stem 14 to the valve control apparatus 10.

The valve control apparatus includes a housing having an upper member 21 and a lower member 22 joined together at flanges 23 and 24 respectively. Pressure connections 26 and 27 are provided in the upper housing member 21. Pressure lines 28 and 29 connect the pressure connections 26 and 27 to a four-way valve generally designated as 30, the operation of which will be described more fully hereinafter.

Referring now to FIGS. 2, 3, 4, and 5, there is shown the valve control apparatus 10 including the shaft member 17 which is rotatably mounted within the upper and lower housing members 21 and 22. The upper housing 21 has an opening 33 therein to receive an upper shaft portion 34 of the shaft member 17. The lower housing member 22 has an opening 36 therein to receive a lower shaft portion 37. As shown, the shaft member 17 may include a socket type head 35 on either or both ends thereof to be connected to a valve stem to be operated.

Extending radially from the central portion of the shaft member 17 is a vane 39. The vane 39 is rotatable within the housing through a predetermined arc which is adjustable by positioning adjusting screws 41 and 42 projecting through the lower housing member 22.

A small vane segment 43 is also formed radially on the shaft member 17 oppositely to the vane 39. Vanes 39 and 43 may typically be formed integrally with shaft member 17, or may be fabricated separately and then attached, such as by welding, to the shaft member 17. Vane 43 is effectively an extension of vane 39 and prevents fluid introduced into one side of the housing from flowing to the opposite side of the housing. While the shaft member 17 could be positioned closer to the housing 10, some seal nevertheless has to be provided to prevent fluid from flowing around the periphery of the shaft. The vane 39 has a peripheral groove 46 formed around its entire periphery. Likewise, the small vane segment 43 has a seal groove 47 formed around the periphery thereof. A one piece molded seal generally designated as 49 has a portion 51 adapted to fit within the groove 46 around the periphery of the vane 39. A second portion 52 is adapted to fit within the groove 47 of the small vane segment 43. Interconnecting the seal portions 51 and 52 are a pair of circular portions 54 and 56 respectively which encircle the upper and lower shaft portions 34 and 37 respectively. Alternatively, instead of using vane 43, the shaft member 17 could be positioned closer to the inner surface of the housing 10. A groove could then be provided longitudinally in the shaft member 17 to receive the seal portion 52 interconnecting the circular portions 54 and 56. By providing a sealing member of this shape, a continuous seal is provided which prevents fluid from leaking from one side of vane 39 to the other and also prevent fluid from leaking out of the housing along shaft member 17.

Figure 4:
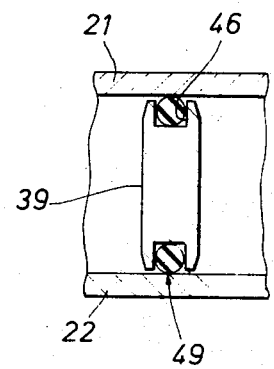
FIG. 4 is a fragmentary cross-sectional view taken along line 4—4 of FIG. 3 illustrating the cooperation between the vane, seal and housing.
Figure 5:
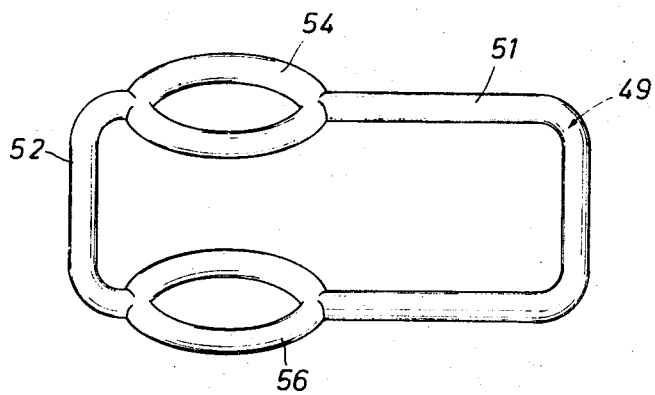
FIG. 5 is a perspective view illustrating the one piece seal.

To be effective, the seal 49 should have a cross-sectional diameter which is greater than the depth of the grooves 46 and 47. This is to insure that the seal 49 is compressed against the interior of the housing 10 and wipes the interior surface thereof during movement of the vane 39 to prevent fluid leakage. It is to be noted that the side walls of the grooves 46 and 47, as shown in FIG. 4, encompass substantially all but a small exposed area of the seal 49 to provide lateral support to the seal portions 51 and 52. When the shaft member 17 and vanes 39 and 43 rotate, the exposed area of the seal 49 wipes against the interior of the housing 10 to provide the desired fluid seal. The side walls of the grooves 46 and 47 support the seal 49 sufficiently to counteract the lateral and twisting forces induced during rotation. Thus, the seal is not overstressed during each operation of the valve control apparatus, and accordingly the useful life of the seal is lengthened considerably.

While the seal is preferably molded in one piece, it may of course be molded in a flat mold and have the ends thereof joined together. Or if desired, it may be molded in two or more pieces and cemented together. Typically, the cross section of the seal member 49 is circular since this shape offers the least resistance to movement of the vane 39 past the interior of the housing 10. However, other shapes may be used if desired. The seal member 49 is typically made of a resilient material such as rubber, but may also be made of other materials such as Teflon or the like.

On installing the seal member 49 in the apparatus, the upper housing member 21 is removed and the shaft member 17 is withdrawn from the lower housing member 22. The old seal is removed and a new seal 49 is installed, by first inserting one end of the shaft member 17 into either of the circular sections 54 and 56. Then the straight seal portions 51 and 52 are inserted into the grooves 46 and 47 and the other circular portion is pulled onto the other end of the shaft. The shaft member 17 is then reinstalled through the opening 36 in the lower housing member 22.

Figure 2:
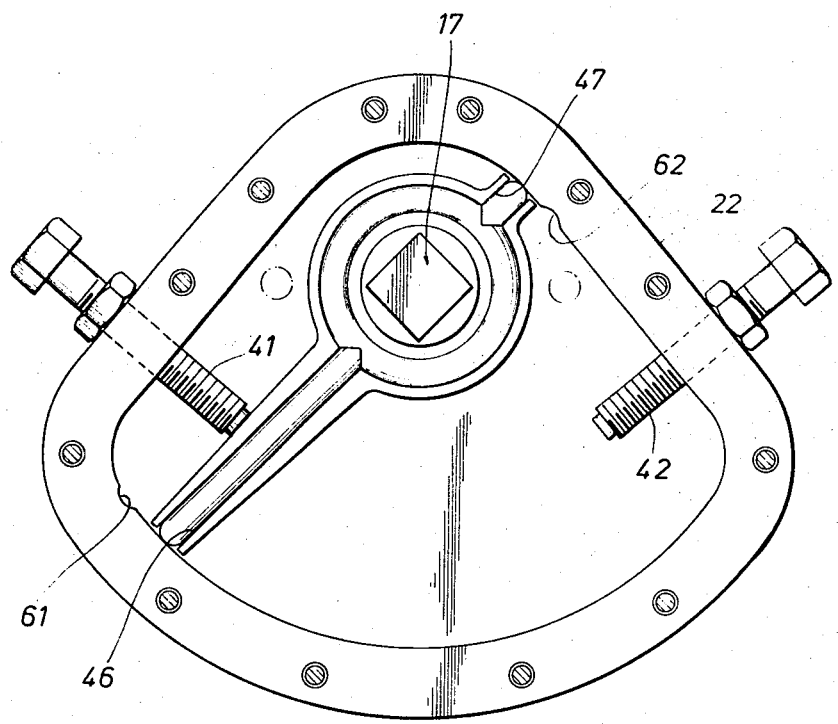
FIG. 2 is a plan view of the valve control apparatus with the top of the housing removed, taken along line 2—2 of FIG. 1.
Figure 3:
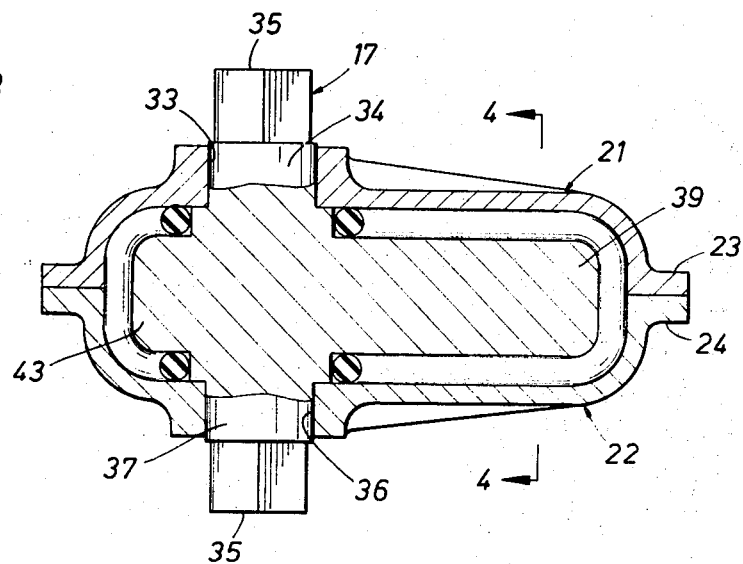
FIG. 3 is a cross-sectional view taken along line 3—3 of FIG. 1 illustrating the vane and one piece seal.

Since the seal 49 is urged against the interior of the housing to facilitate assembly of the apparatus it is desirable to provide undercut portions or recesses 61 and 62 in the bottom housing member 22 as shown in FIG. 2. Other corresponding undercut portions or recesses are provided in the upper housing member 21. Once the upper housing member 21 is removed for any purpose, such as inspection of the seal, it cannot easily be replaced without the likelihood of pinching the seal 49 at the juncture of the flanges 23 and 24. By providing the undercut portions, the shaft member 17 and vanes 39 and 43 can be rotated by backing off the screw 41 to permit the seal 49 to be positioned within the undercut portions 61 and 62 while the upper half 21 of the housing is installed. This prevents the housing from pinching the portion of the seal 49 located at or near the interface of the flange areas 23 and 24 of the housing 10. After the housing members 21 and 22 are bolted together, the adjustment screw 41 can again be rotated to reposition the vane 39 at the desired valve position.

In operation of the apparatus, consider that air or hydraulic fluid is introduced through line 28. The vane 39 and shaft member 17 will rotate counterclockwise as viewed in FIG. 2. The vane will stop when it abuts against the adjustment screw 42. Rotation of the shaft member 17, of course, rotates the valve stem 14 of the valve 11. To return the valve 11 to its original position, the four-way valve 30 is again actuated to permit hydraulic fluid or air to enter line 29. When hydraulic fluid enters the housing through line 29 and pressure connection 27, the vane 39 is rotated clockwise and the remaining fluid in the housing is exhausted through the fitting 26 and line 28.

The seal 49 at all times prevents leakage of fluid from one side of the vanes 39 and 43 to the other, thus insuring maximum application of force to impart rotary movement to the valve stem 14. Additionally, the circular portions 54 and 56 of the seal 49 prevent any fluid from leaking around the shaft member 17. Thus the subject valve apparatus provides a very simple, efficient and effective facility for providing rotary movement of a valve stem.

It is to be understood that the embodiments described and illustrated herein are merely illustrative of an application of the principles of this invention and that numerous other arrangements and modifications may be made in the structures illustrated without departing from the spirit and scope of this invention.

What is claimed is:

1. A valve controlling apparatus comprising a housing, shaft means extending from at least one side of the housing, the housing comprising two similar parts, means to fasten the two parts together, the two parts when fastened together having a chamber therein, a vane movably mounted in the chamber, the vane comprising a forwardly extending portion, a rearwardly extending portion and an enlarged portion between the other two portions, the enlarged portion having the shaft means integral therewith, the vane having all portions integral, the forwardly extending portion being of greater extent than the rearwardly extending portion, the periphery of the forwardly extending portion and the rearwardly extending portion having a groove formed therein, the enlarged portion having shoulders adjacent the inward ends of each groove, the shoulders being of the same depth as the depth of the grooves, an integral flexible sealing means in the grooves and engaging the shoulders, the sealing means being substantially round in cross section and having a forwardly extending portion and a rearwardly extending portion, the extending portions being received in the respective grooves in the extending portions of the vane, the periphery of the sealing means being slightly greater than the depth of the groove but substantially the same as the width of the groove, the extending portions of the sealing means being joined by two circular portions, the circular portions engaging the shoulders and surrounding the enlarged portion of the vane, adjustable means in the opposite side wall of the housing to limit the movement of the vane in the housing, the vane and sealing means dividing the chamber into two parts, conduit means for selectively admitting pressure fluid into and form said chamber on respectively opposite sides of said vane to move the vane therein, the sealing means engaging the walls of the chamber and preventing the escape of pressure from the one part of the chamber to the other part, the two parts of the housing each have a pair of recesses formed therein at a position which is not contacted by said seal during normal movement of said vane to receive at least a portion of said extending seal portions to permit assembly of said upper and lower housing members without pinching said seal.

* * * * *

UNITED STATES PATENT OFFICE
CERTIFICATE OF CORRECTION

Patent No. 3,688,645          Dated September 5, 1972

Inventor(s) Henry V. Reaves

It is certified that error appears in the above-identified patent and that said Letters Patent are hereby corrected as shown below:

On the cover sheet [73] the name of the assignee should read -- Xomox Corporation, Cincinnati, Ohio, a corporation of Ohio --.

Signed and sealed this 19th day of December 1972.

(SEAL)
Attest:

EDWARD M. FLETCHER, JR.  
Attesting Officer

ROBERT GOTTSCHALK  
Commissioner of Patents